March 3, 1936.　　　E. S. WEGENER　　　2,032,678
TRAVELING AGITATOR MECHANISM
Filed March 27, 1935　　　2 Sheets-Sheet 1
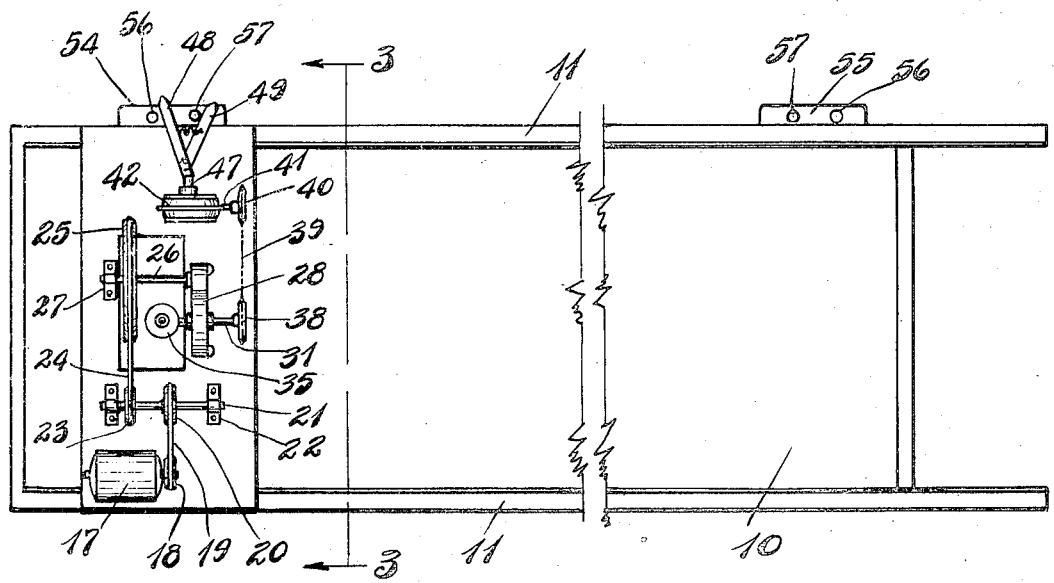
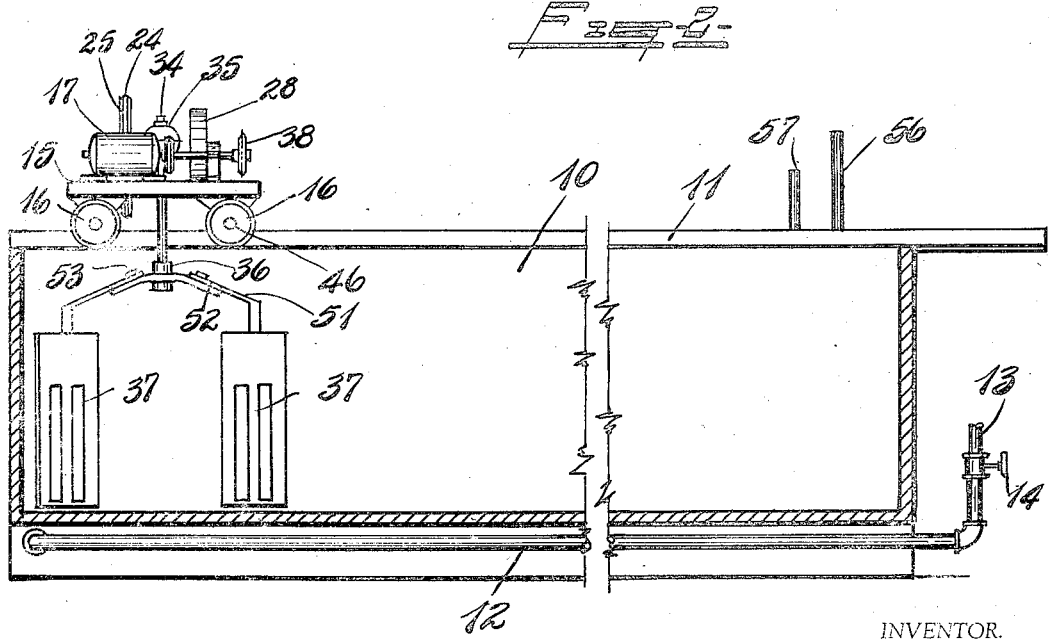
INVENTOR.
Erwin S Wegener
BY
Frank C Karman.
ATTORNEY.

March 3, 1936.  E. S. WEGENER  2,032,678
TRAVELING AGITATOR MECHANISM
Filed March 27, 1935   2 Sheets-Sheet 2
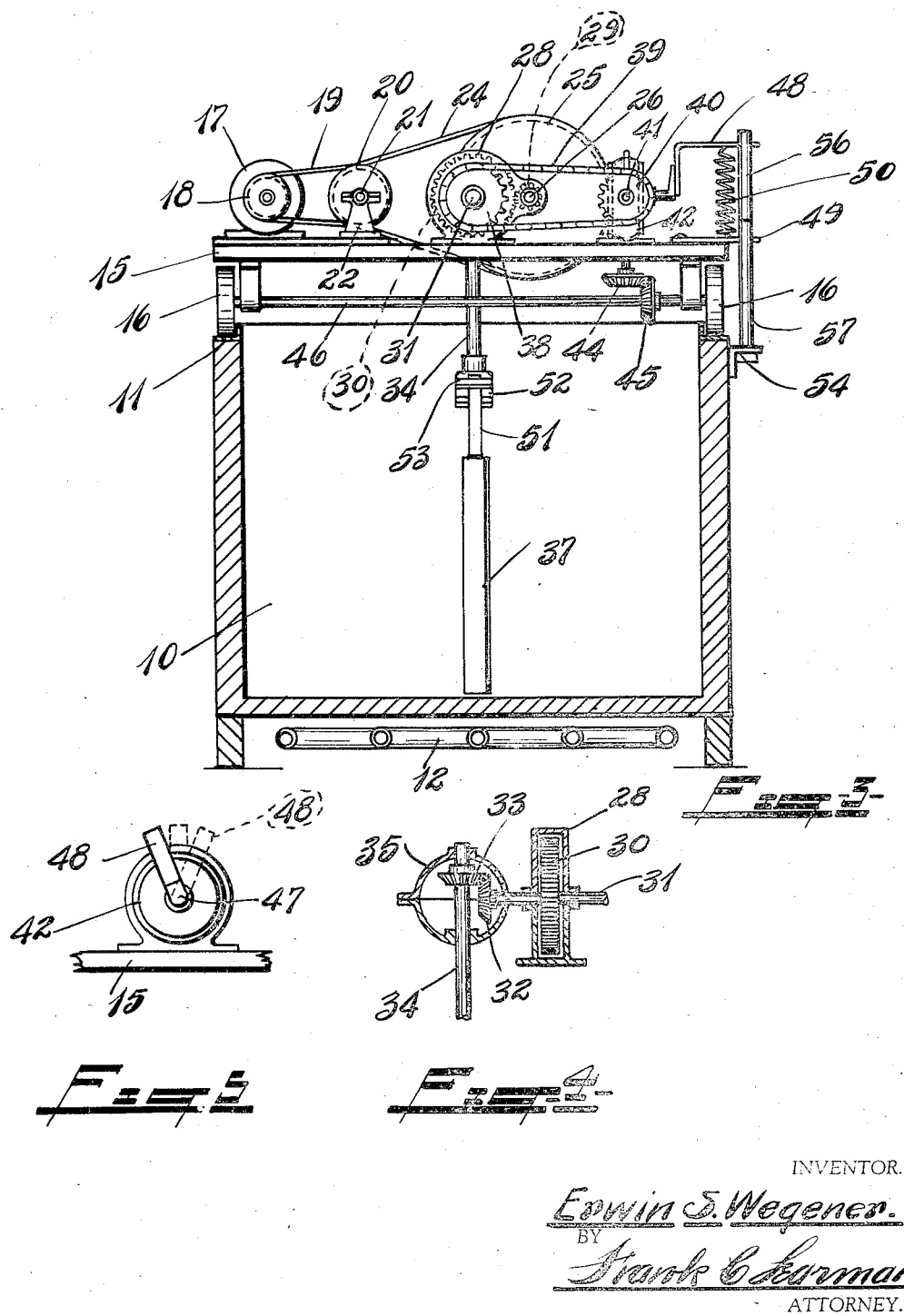
INVENTOR.
Edwin S. Wegener.
BY Frank C. Larman
ATTORNEY.

Patented Mar. 3, 1936

2,032,678

UNITED STATES PATENT OFFICE 2,032,678

TRAVELING AGITATOR MECHANISM

Erwin S. Wegener, Freeland, Mich.

Application March 27, 1935, Serial No. 13,254

3 Claims. (Cl. 259—102)

This invention relates to agitators, and more particularly to a mechanism for agitating milk and similar products used in the manufacture of cheese.

One of the prime objects of the invention is to design a very simple, practical, and efficient agitating mechanism mounted for movement across a tank or vat so that the contents will be uniformly agitated to insure satisfactory treatment of the product.

Another object is to provide means for automatically reversing the direction of travel of the agitating mechanism so that the operation can be continued for any desired period of time without supervision or attention from an attendant.

A further object is to provide a mechanism which can be readily shifted to position from over the vat opening so that the entire vat opening is unobstructed and free for removal of the vat contents, for cleaning, or for any other purposes.

Still another object is to provide an agitating mechanism which evenly stirs the contents of the vat so that there will be no so called dead zones or areas in which the product remains dormant.

A still further object is to design an agitating mechanism which can be readily installed and operated, which is simple and economical to manufacture, and which can be adjusted to various speeds to suit the product being treated.

With the above and other objects in view, the present invention consists in the combination and arrangement of parts, hereinafter more fully described, illustrated in the accompanying drawings, and particularly pointed out in the appended claims, it being understood that changes may be made in the form, size, proportion, and minor details of construction, without departing from the spirit, or sacrificing any of the advantages of the invention.

In the drawings—

Fig. 1 is a side elevation of a vat showing my traveling agitating mechanism in place thereon, the vat being shown in section.

Fig. 2 is a top plan view.

Fig. 3 is an enlarged transverse sectional view taken on the line 3—3 of Fig. 2.

Fig. 4 is an enlarged sectional detail illustrating the agitator driving gears.

Fig. 5 is an end view of the gear reversing mechanism, the broken lines showing the shifting lever in neutral and reversed position.

Referring now more specifically to the drawings in which I have shown the preferred embodiment of my invention, the numeral 10 indicates a conventional vat made up of any desired material and provided with tracks 11 on the upper edges thereof, these tracks extending a predetermined distance beyond the end of the vat so that the agitating mechanism can be rolled from over the top of the vat when not in use, thus leaving the vat opening entirely clear to facilitate the removal of the curd, for repair of the mechanism, or any other reason.

In the treatment of milk for making cheese, the milk must be heated to a predetermined temperature so that the curd properly forms, and steam pipes 12 are provided beneath the bottom of the vat and are connected to any suitable source of steam or heat supply by means of the pipe 13, a valve 14 being provided for regulating the steam and/or heat desired.

After the milk has set to form the curd, the entire mass is cut with a curd cutter (not shown) in both a horizontal and a vertical direction, thereby forming into small cubes or pieces which must then be agitated.

The agitating mechanism proper comprises a truck frame 15 provided with wheels 16 which engage and ride on the tracks 11, a motor 17 being mounted on the truck frame as usual and includes a drive pulley 18, a suitable belt 19 serving to gear said pulley to a similar pulley 20 which is mounted on the longitudinally disposed countershaft 21, said shaft being mounted in bearings 22 provided on the truck frame.

A pulley member 23 is also mounted on the shaft 21, and a belt 24 serves to gear said pulley to a larger pulley 25 which is mounted on the shaft 26, one end of said shaft being journaled in a conventional bearing 27, the opposite end being journaled in the gear housing 28, and a spur gear 29 is mounted thereon, said spur gear meshing with and driving the larger gear 30 which is mounted on the shaft 31.

The shaft 31 projects beyond the gear housing 28, and a bevel gear 32 is mounted thereon, said gear meshing with and driving a similar gear 33 which is mounted on the upper end of the vertically disposed shaft 34, a housing 35 forming a closure for said gears, and a bracket 36 is provided on the lower end of said shaft to facilitate the mounting of the agitating paddles 37 in a manner to be presently described.

A sprocket 38 is mounted on the opposite end of the shaft 31, and a chain 39 serves to gear it to a similar sprocket 40 which is mounted on the shaft 41 which forms a part of the conventional gear reversing mechanism which is housed in the casing 42, a vertically disposed shaft 43 depending from said housing, and a bevel gear 44 is mounted thereon, said gear meshing with and driving the bevel gear 45 which is mounted on the axle shaft 46 on which one pair of wheels 16 is mounted so that the truck is power driven.

A clutch shaft 47 projects from one side of the housing, and a bar member 48 is secured thereon and projects beyond the side wall of the vat. Another bar 49 is pivotally secured to the face of the truck frame, the free end projecting beyond the side wall of the vat; a spring 50 connects these bars 48 and 49, and for a purpose to be later described.

The agitating paddles 37 are preferably flat and are detachably mounted on the bracket 36, each paddle having a slight lead so that a maximum displacement of the curd takes place when the device is in operation, the stem 51 of each member being placed in the passage formed by the blocks 52 and is held in position by means of the transversely disposed bar 53.

Brackets 54 and 55 respectively are provided on the side wall of the vat, and pins 56 and 57 are detachably mounted therein, the pin 56 being of greater height than the pin 57, and as the truck travels on the tracks 11, the pin 57 first engages the bar 49, swinging it on its pivot so that the spring 50 exerts a pull on the upper bar 48. Continued travel of the truck brings the bar 49 into contact with the pin 56, swinging it to neutral position, the tension of the spring 50 further forcing the bar around so that the shift is completed, and the truck then travels in the opposite direction, and I wish to direct particular attention to the fact that there is a pause in the travel of the truck at each end of the vat caused by the time required for shifting the shifting lever to neutral and then into gear, so that a couple of additional revolutions of the paddle agitators occur before the truck begins travel in the opposite direction, thereby agitating the curd in the corners of the tank.

A similar arrangement is provided at the opposite end of the vat, and it will, therefore, be obvious that the truck will travel back and forth without supervision or attention so that the curd will be properly agitated and set.

A variable speed motor is preferable so that the speed can be adjusted to suit, and is connected to any suitable source of power. The parts which come in contact with the product are quickly detachable and are readily cleaned so that an ideal sanitary condition is maintained.

From the foregoing description it will be obvious that I have perfected a very simple, practical, and efficient traveling agitator mechanism for agitating milk curd and similar products.

What I claim is:

1. In an apparatus of the character described, a vat having tracks on the upper edges thereof, a truck mounted to travel on said tracks, a vertically disposed agitator mechanism mounted on said truck and extending into said vat, a motor mounted on said truck and geared to said agitating mechanism, a gear reversing mechanism operatively connected with said agitating mechanism, gears operatively connecting said gear reversing mechanism with the truck driving mechanism for imparting motion thereto, a shifting lever on said gear reversing mechanism, spaced apart pins mounted on the side wall of the vat, a lever pivotally mounted on the carriage and projecting beyond the side wall of the vat, a spring connecting said lever and shifting lever for completing the movement of the shifting lever after it has contacted with one of said pins.

2. In an apparatus of the character described, an open vat having tracks on the upper edges thereof, a truck mounted to travel thereon, an agitating mechanism mounted on the truck and extending into said vat, detachable paddles forming a part of said mechanism, a driven gear reversing mechanism, a shifting lever connected thereto and projecting beyond the side wall of the vat, gears connecting said truck axle and gear reversing mechanism, a second lever pivotally mounted on the truck, a motor operatively connected to said agitating mechanism spaced apart, vertical posts of unequal heights mounted on the side wall of the vat, one of said posts projecting into the path of travel of the shifting lever, the opposite post projecting into the path of travel of the second lever, and a spring connecting said lever to assist in shifting the shifting lever for reversing the direction of travel of the truck.

3. In an apparatus of the character described, a vat, a wheeled truck mounted to travel thereon, a vertically disposed agitating mechanism mounted on the truck and including vertically elongated detachable paddles, a gear reversing mechanism geared to said agitating mechanism, a motor operatively connected to the agitating mechanism, a shiftable lever on the reversing mechanism, posts of unequal heights mounted on the side wall of the vat, one of said posts extending into the path of travel of the shifting lever, a second lever mounted on the carriage and adapted to engage the opposite post at a predetermined point in the travel of the carriage, and resilient means connecting said levers for assisting in the shifting of said shifting lever.

ERWIN S. WEGENER.